United States Patent [19]
Fairhurst

[11] Patent Number: 5,150,203
[45] Date of Patent: Sep. 22, 1992

[54] VARIABLE CHROMINANCE FILTERING FOR ENCODING TELEVISION SIGNALS

[75] Inventor: Jon A. Fairhurst, Grass Valley, Calif.

[73] Assignee: The Grass Valley Group, Inc., Nevada City, Calif.

[21] Appl. No.: 633,821

[22] Filed: Dec. 26, 1990

[51] Int. Cl.$^5$ .................. H04N 9/78; H04N 11/14
[52] U.S. Cl. ............................. 358/40; 358/31
[58] Field of Search ............ 358/40, 21 R, 31, 36, 358/38

[56] References Cited

U.S. PATENT DOCUMENTS

| | | | |
|---|---|---|---|
| 4,167,020 | 9/1979 | Holmes | 358/36 |
| 4,651,196 | 3/1987 | Harwood et al. | 358/38 |
| 4,656,502 | 7/1987 | Hansdorfer | 358/31 |
| 4,686,561 | 8/1987 | Harwood et al. | 358/31 |
| 4,706,112 | 11/1987 | Faroudja | 358/31 |
| 4,731,660 | 3/1988 | Faroudja et al. | 358/31 |
| 4,831,463 | 5/1989 | Faroudja | 358/31 |
| 4,849,808 | 7/1989 | Rossi | 358/31 |
| 4,916,526 | 4/1990 | Faroudja et al. | 358/31 |
| 4,961,108 | 10/1990 | Perlman | 358/40 |
| 5,012,329 | 4/1991 | Lang | 358/31 |

*Primary Examiner*—Tommy P. Chin
*Attorney, Agent, or Firm*—Boulden G. Griffith; John Smith-Hill

[57] ABSTRACT

A chrominance filtering system reduces chrominance detail when sufficient luminance detail is present, but limits how much chrominance detail is reduced when insufficient luminance detail is present. The chrominance input signal is applied to a high pass filter and a suitable delay circuit. The output of the high pass filter, $C_{hp}$, is a signal indicative of chrominance detail. It is applied to the input of a bipolar clipping circuit that also receives a control signal, $|Y_{hp}'|_{clipped}$ indicative of luminance detail. The control signal is derived by high pass filtering, rectifying and low pass filtering the luminance signal to produce a signal, $|Y_{hp}|$, that is absolute value of high pass filtered luminance activity. This signal is then scaled by multiplication by a first constant and then offset by addition to a second constant to produce $|Y_{hp}'|$. $|Y_{hp}'|$ is then clipped to be between a minimum and a maximum value to produce the control signal $|Y_{hp}'|_{clipped}$. The bipolar clipping circuit constrains $C_{hp}$ to produce $C_{hpc}$ according to the following relationships: If $C_{hp}$ is $>$ or $=0$, then $C_{hpc}$ is $>$ or $=$ to $|Y_{hp}'|_{clipped}$; or if $C_{hp}$ is $<0$, then $C_{hpc}$ is $<$ or $=$ to $-|Y_{hp}'|_{clipped}$. The first and second constants and the minimum and maximum values are optimized empirically.

26 Claims, 6 Drawing Sheets

VARIABLE CHROMINANCE FILTERING FOR ENCODING TELEVISION SIGNALS

BACKGROUND OF THE INVENTION

This invention relates to color television signal encoding, and more particularly to the field of selectively filtering the chrominance signal in a color television signal encoder.

When the NTSC and PAL television systems were originated, one of the key concepts involved the relationship between chrominance and luminance bandwidths. It was reasoned that since the human eye is more sensitive to luminance detail than it is to chrominance detail, and since most of the detail in the real world, and particularly human faces, is in the luminance domain, it is possible to transmit all of the necessary chrominance detail using a narrower bandwidth than that necessary to transmit all of the luminance detail. Accordingly, it was determined that the chrominance signal could be band-limited, permitting it to share the same spectrum with the luminance signal by being impressed as carrier suppressed amplitude modulation components in phase quadrature upon luminance bearing main carrier and be successfully separated out by demodulation in the decoding process.

Ever since this strategic decision, the designers of color television encoders and decoders have been struggling to overcome the side effects of this bandwidth sharing. Because of the spectral overlap between the luminance and chrominance information, it has proven virtually impossible to perfectly separate the two. The incomplete separation of these two signals results in luminance component contamination in the chrominance signal component. The result of this contamination is called "cross-color", the familiar "rainbow" artifacts. Chrominance component contamination in the luminance signal component is known as "cross-luminance" or "dot-crawl".

While it has proven extremely difficult to totally eliminate these artifacts, a variety of means have been invented to reduce them and limit the situations in which they occur. Accordingly, modern television systems display ever decreasing amounts of these effects as these inventions take their place in the industry. Comb filters are now used widely, both in encoders and decoders, and in both the horizontal dimension (adjacent pixels on the same line) and the vertical dimension (same pixel location of consecutive lines), and even in the third dimension of consecutive frames.

The prior art is now replete with variations that attempt to solve one facet of this problem or another. Various schemes for filtering at the receiver/decoder have been used. For example, U.S. Pat. No. 4,686,561 to Harwood et al for a "Vertical Detail Information Restoration Circuit" discloses comb filtering of the composite color video signal to produce comb filtered chrominance and luminance signals. A baseband color difference signal is produced from the comb filtered chrominance signal and the presence of high frequency information in the baseband color difference signal is detected. The bandwidth of the low frequency portion of the comb filtered chrominance signal which is restored to the comb filtered luminance signal is varied in response to a control signal derived from the detected presence of the high frequency information in the baseband color difference signal.

Another approach is described in U.S. Pat. No. 4,651,196 to Harwood et al for "Adaptive Control of the Chrominance Signal Frequency Response in a Video Signal Processing System". In this approach, the adaptive bandpass filter is controlled to have a narrow bandwidth when significant amounts of relatively high frequency vertical detail information are present and to have a wide bandwidth otherwise.

In U.S. Pat. No. 4,731,660 to Faroudja et al for "Processing Methods Using Adaptive Threshold for Removal of Chroma/Luminance Cross-Talk in Quadrature Modulated Subcarrier Color Television Systems" a variable threshold circuit is controlled by a signal derived as a function of at least one of the luminance diagonal transition level, the chroma level, and the averaged luminance activity in the spectrum in the vicinity of the color subcarrier.

U.S. Pat. No. 4,916,526 also to Faroudja et al for "Bandwidth Control for Chrominance and Luminance Paths in Quadrature Modulated Color Television System" discloses a method for reducing the bandwidth of a chrominance path to reduce cross-color artifacts. The method includes the steps of detecting the level of the chrominance component of the signal; developing a control signal from the detected level; and, controlling the bandwidth of the chrominance path in accordance with the control signal so as to reduce bandwidth only when the chrominance component is at a level below a predetermined threshold. An optional further step is to establish a predetermined minimum threshold value of the chrominance level below which the control signal is not generated.

And, U.S. Pat. No. 4,167,020 to Holmes for "Suppression of Luminance Signal Contamination of Chrominance Signals in a Video Signal Processing System" discloses sensing delayed and undelayed versions of the video signal, wherein the amount of delay corresponds to an interval during which rapid luminance transitions capable of producing high frequency signals within the chrominance passband can occur. The sensing multiplier generates a control signal indicative of the presence of the luminance transitions. The control signal is then utilized for controlling the chrominance signal processing channel.

Another approach to reducing these undesirable artifacts is to prefilter either the chrominance or luminance signals or both in the color television signal encoder prior to modulation and transmission. U.S. Pat. No. 4,849,808 to Rossi for a "System for Filtering Color Television Signals Utilizing Comb Filtering of Luminance with Variable Combing Level at Low Frequencies and Filtering of Chrominance by Comb Filtering Time Multiplexed Color Difference Signals" discloses an approach that uses vertical filtering of both chrominance and luminance signal independently of each other.

U.S. Pat. No. 4,656,502 to Hansdorfer for a "Color Mixing or Interference Reduction Circuit in Color TV Decoding Circuits" discloses an encoding method in which increasing amounts of higher frequency components of the luminance signal are subtracted from the luminance signal in response to an increase in the amount of the luminance signal that is within the chrominance subcarrier bandpass.

None of the foregoing approaches deal very effectively with a particular situation that can arise, particularly now that television pictures no longer contain only human faces and scenery, but increasingly contain the output of graphic generators and special effects devices. When the level of luminance details is very low, the normal approach used, of sacrificing the chroma detail to enhance the luminance detail, results in a very soft, washed out, and blurry picture with little of either type of detail.

What is desired is a chrominance filtering system that reduces chrominance detail when sufficient luminance detail is present, but which limits how much chrominance detail is reduced when insufficient luminance detail is present.

SUMMARY OF THE INVENTION

To illustrate the problem referred to above, if one creates an image of a magenta square on a green background with both colors of high saturation and of nearly the same luminance values, one would find, by varying the chrominance bandwidth of the encoder to trade-off dot-crawl against picture softness, that a small amount of dot-crawl is subjectively beneficial to the viewer. This is because the luminance content of the dot-crawl helps to define the boundary between the two colors. As the chrominance bandwidth is decreased, both the chrominance detail and the dot-crawl also decrease, effectively blurring the boundary between the foreground and background.

Accordingly, it is an object of the present invention to provide a chrominance filtering system that reduces chrominance detail when sufficient luminance detail is present, but which limits how much chrominance detail is reduced when insufficient luminance detail is present.

In a preferred embodiment of the present invention, a chrominance input signal is applied to a high pass filter and a suitable delay circuit. The output of the high pass filter, $C_{hp}$, is a signal indicative of chrominance detail. It is applied to the input of a bipolar clipping circuit that also receives a control signal indicative of luminance detail, $|Y_{hp}'|_{clipped}$. The control signal is derived by high pass filtering the luminance signal to produce a high pass filtered luminance signal, $Y_{hp}$. This signal is then rectified and low pass filtered to produce an absolute value of high pass filtered luminance signal, $"Y_{hp}|$. $|Y_{hp}|$ is then scaled by multiplication by a first constant and offset by addition to a second constant to produce $"Y_{hp}'"$. $"Y_{hp}'|$ is then clipped to be between a minimum and a maximum value to produce the control signal $|Y_{hp}'|_{clipped}$. The bipolar clipping circuit constrains $C_{hp}$ to produce $C_{hpc}$ according to the following relationships: If $C_{hp}$ is $>$ or $=0$, then $C_{hpc}$ is $<$ or $=$ to $|Y_{hp}'|_{clipped}$; or If $C_{hp}$ is $<0$, then $C_{hpc}$ is $>$ or $=$ to $-|Y_{hp}'|_{clipped}$. The first and second constants and the minimum and maximum values are optimized empirically.

The subject matter of the present invention is particularly pointed out and distinctly claimed in the concluding portion of this specification. However, both the organization and method of operation, together with further advantages and objects thereof, may best be understood by reference to the following detailed description and accompanying drawings.

DETAILED DESCRIPTION

Figure 1:
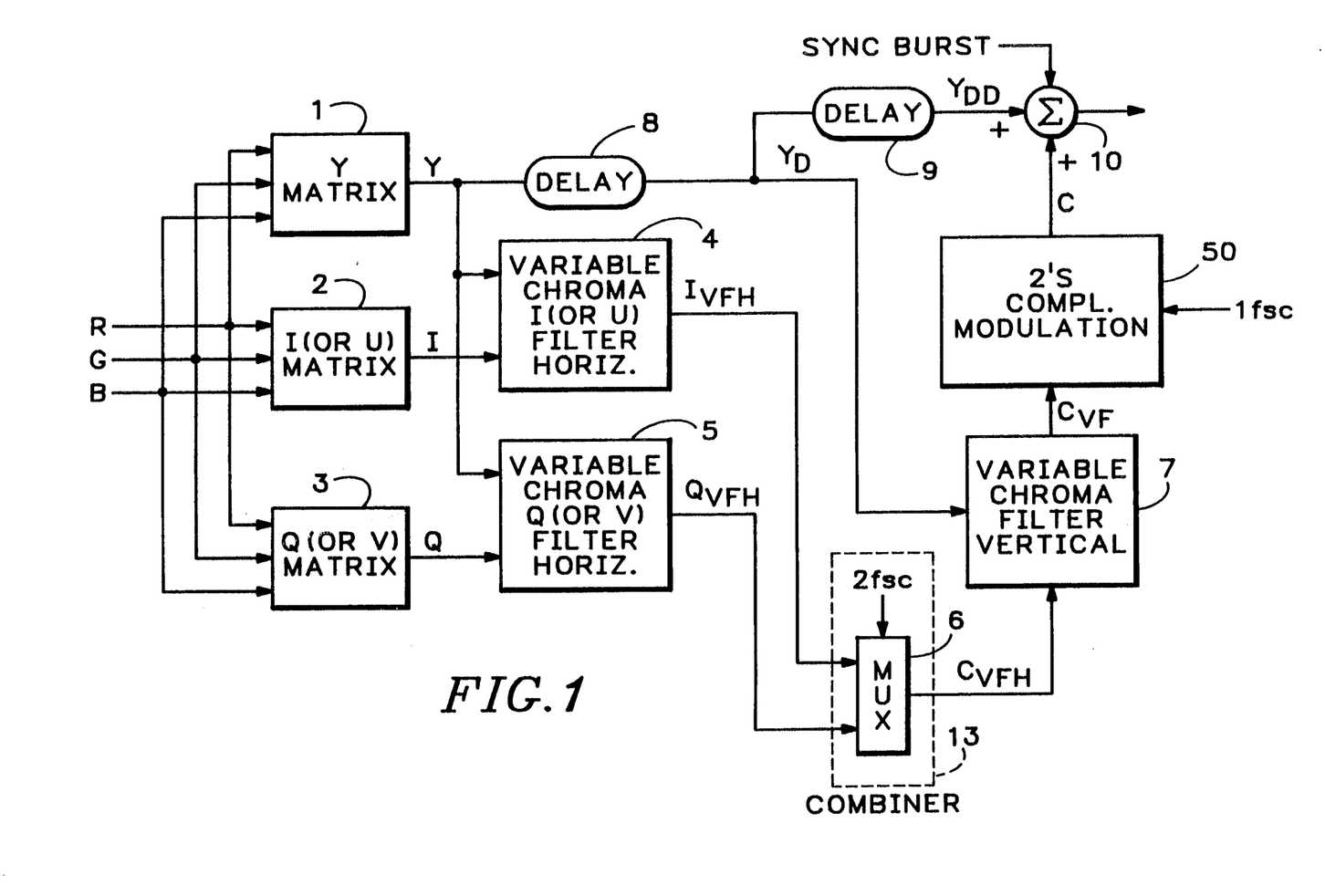
FIG. 1 is a simplified block diagram of a color television signal encoder containing two variable chrominance filters according to the present invention.

FIG. 1 is a simplified block diagram of a color television signal encoder employing variable chrominance filters 4, 5, and 7 according to the present invention. Red, green and blue inputs from a camera or other source are applied to a Y matrix 1, an I (or U) matrix 2, and a Q (or V) matrix 3. The I and Q outputs of the I matrix 2 and Q matrix 3 are horizontally filtered by variable chrominance I (or U) and Q (or V) filters 4 and 5, respectively, which also receive the luminance signal Y. The outputs of the horizontal variable chrominance filters 4 and 5, $I_{vfh}$ and $Q_{vfh}$, respectively, are then multiplexed together at $2f_{sc}$ by multiplexer 6 to produce a chrominance signal that has been variably filtered horizontally, $C_{vfh}$. Delay element 8 matches the delays through the variable chrominance filters 4 and 5 and multiplexer 6.

The variably filtered horizontally chrominance signal, $C_{vfh}$, of multiplexer 6 is applied to one input of a variable chrominance filter 7 that filters in the vertical dimension. The vertical variable chrominance filter 7 also has as an input the delayed luminance signal, $Y_d$. The output of vertical variable chrominance filter 7, $C_{vf}$, is modulated by 2's complement modulator 50 to produce a final chrominance signal, C. The final chrominance signal C is then added to the twice delayed luminance signal $Y_{dd}$ by summing circuit 10, which also adds sync and burst information. In an analog system, the multiplexer 6, 2's complement modulator 50, and summing circuit 10 would be replaced by a quadrature modulator and mixer after the variable chrominance filtering in the vertical dimension.

Figure 2:
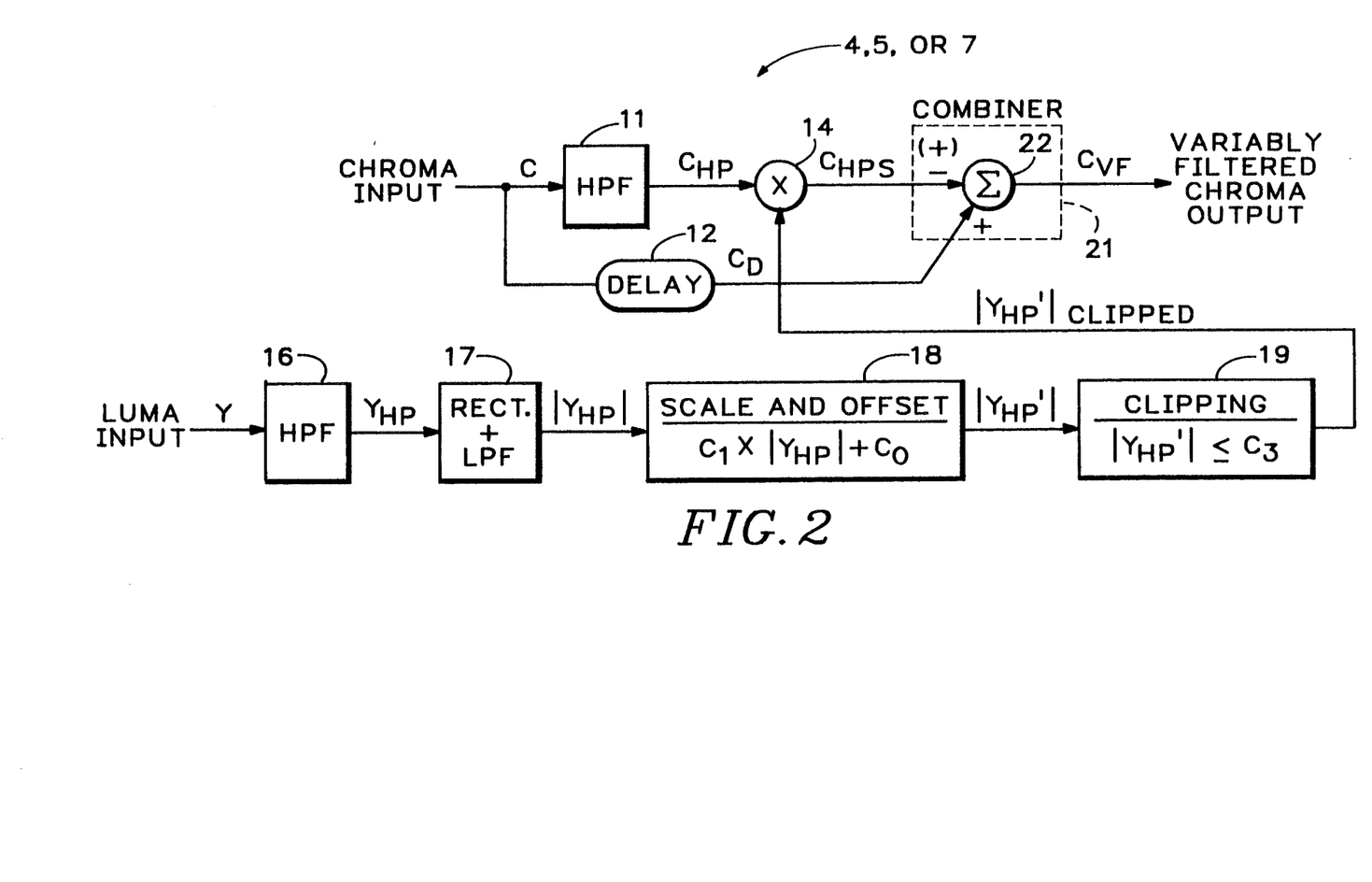
FIG. 2 is a block diagram of one embodiment of the variable chrominance filter according to the present invention.

FIG. 2 is a block diagram of one embodiment of the variable chrominance filters 4, 5 or 7 according to the present invention. A chrominance input signal is applied to a high pass filter 11 and a delay circuit 12. The delay of the delay circuit 12 is chosen to be equivalent to the delay through the high pass filter 11 and multiplier 14. The high pass filter 11 typically has a cutoff frequency of about 250 KHz. The output of the high pass filter 11 is a chrominance detail signal, $C_{hp}$, for high pass filtered chrominance, that is applied to one input of a multiplier 14.

A luminance input is applied to a high pass filter 16 to produce a high pass filtered luminance signal, $Y_{hp}$. The high pass filter 16 typically has a cutoff frequency of about 500 KHz. The output of the high pass filter 16 is then rectified and low pass filtered by rectification and low pass filtering circuitry 17 to produce $|Y_{hp}|$, a signal indicative of the luminance high frequency activity.

Figure 3:
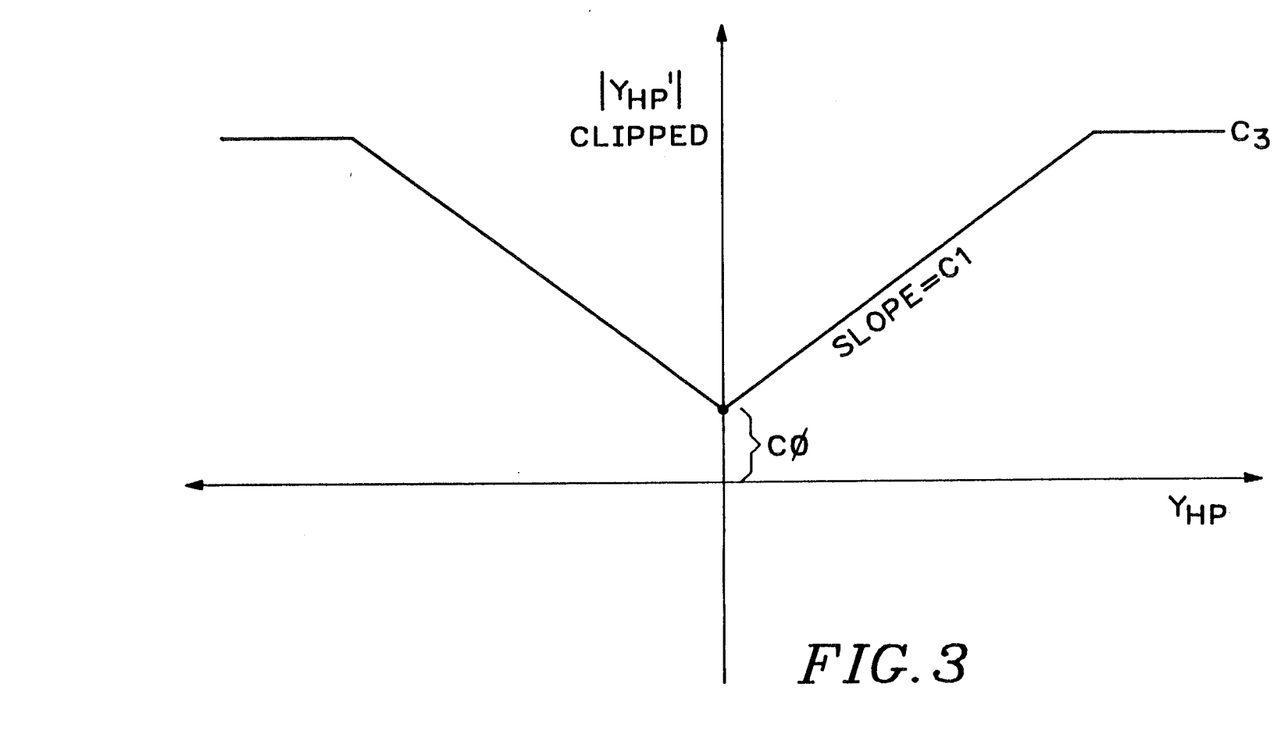
FIG. 3 is a graph of the relationship between $Y_{hp}$ and $|Y_{hp}'|_{clipped}$.

Referring now to FIG. 3 as well as FIG. 2, the absolute value of the high pass filtered luminance signal, $\uparrow Y_{hp}|$, is applied to the input of scaling and offsetting circuit 18, which multiplies $|Y_{hp}|$ by a first constant, C1, to scale it, and adds a second constant, C0, to offset it, producing $|Y_{hp}'|$, the scaled and offset absolute value of the luminance signal.

The scaled and offset absolute value of the luminance signal, $|Y_{hp}'|$, is applied to a clipping circuit 19 which limits its maximum value to be less than a third constant C3, that is preferably equal to unity, producing a clipped, scaled and offset absolute value of luminance, $|Y_{hp}'|_{clipped}$, a luminance detail signal.

The clipped, scaled and offset absolute value of luminance, $|Y_{hp}'|_{clipped}$, is applied to the other input of multiplier 14, where it is used to scale the high pass filtered chrominance signal, $C_{hp}$. The scaled high pass filtered chrominance signal, $C_{hps}$, is combined by combiner 21 with the delayed chrominance signal, $C_d$, to produce a variably filtered chrominance signal, $C_{vf}$. Typically, the combiner 21 is a summing circuit 22, but it could include any other mathematical function that accomplished a similar result, i.e., reducing $C_d$ according to $|Y_{hp}'|_{clipped}$. When the combiner 21 is the summing circuit 22, the scaled high pass filtered chrominance signal, $C_{hps}$, is applied to a negative terminal of the summing circuit 22 and the delayed chrominance signal, $C_d$, is applied to the positive input. The output of the summing circuit 22 is then the variably filtered chrominance signal, $C_{vf}$.

C0 determines the minimum amount that the high frequency portion of the chrominance signal will be multiplied by without regard to the level of high frequency activity in the luminance signal. Typically C0 will have a value between 0.00 and 0.25, with a preferred value depending on the type of filter being employed, which dimension it is being used in, and operator or design engineer preference.

C1 is the scaling factor and determines the slope of the diagonal line in FIG. 3. The value of C1 will vary with the selections made for the coefficients in the luminance high pass filter 16 and the desired behavior of the signal. In general, it can be said that C1 should be selected so that a clearly noticeable edge transition in luminance produces a value of one or greater in $|Y_{hp}'|$.

C3 determines the maximum amount of high frequency energy that can be removed from the delayed chrominance signal to produce the chrominance output, and is typically and preferably set to one, although other values near one might be desirable for some applications. Some control over the selection of C0, Cl, and C3 can be made available to an operator, but preferably only within a range of generally acceptable values.

Figure 4:
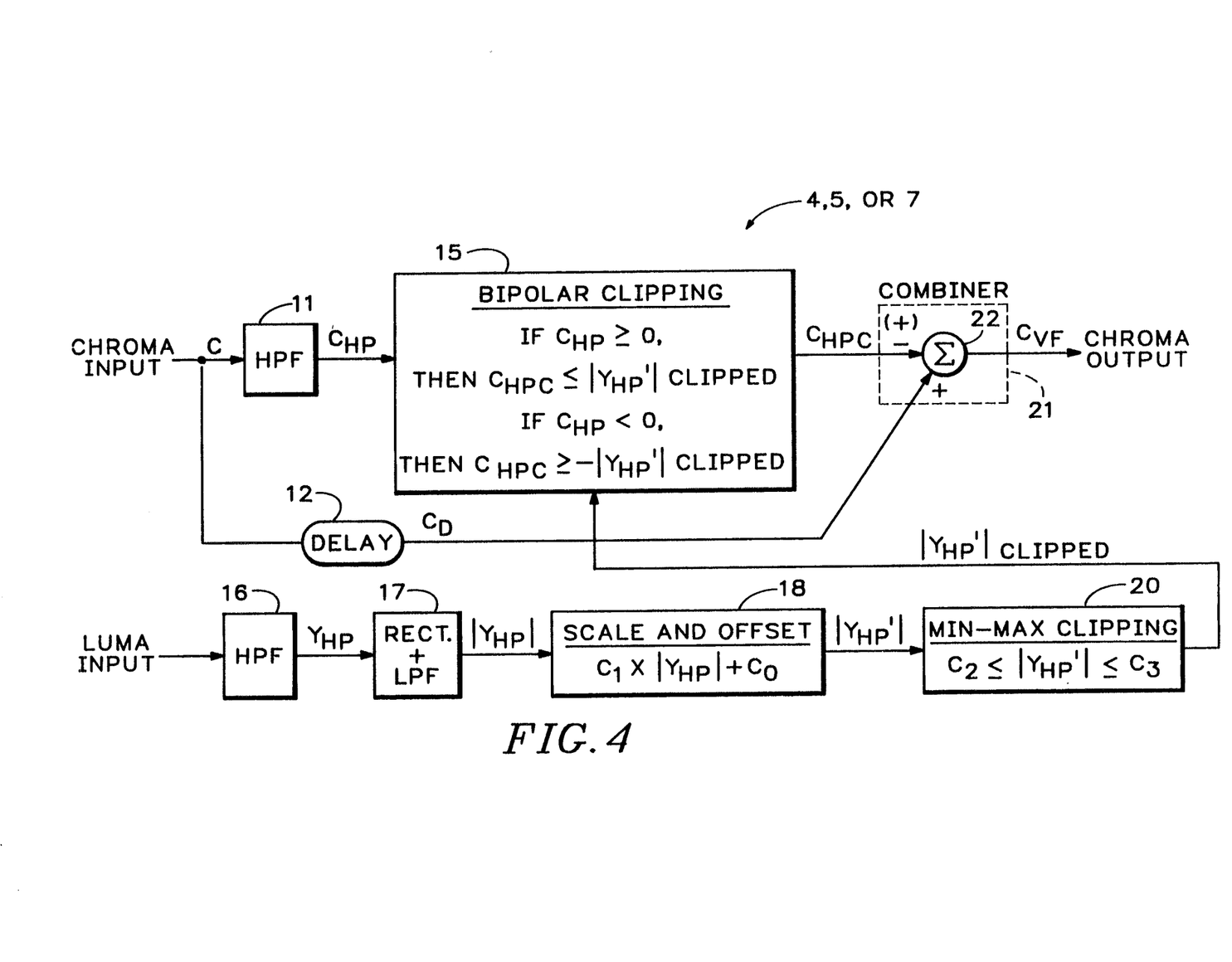
FIG. 4 is a block diagram of a preferred embodiment of the variable chrominance filter according to the present invention.

The first embodiment of the variable chrominance filter shown in FIG. 2 and described above requires a multiplier 14 and multipliers are typically expensive in terms of cost, power, and circuit area. Referring to FIG. 4, a preferred embodiment of the present invention eliminates the need for the multiplier 14 and provides control of the amount of chrominance filtering based on the ratio of the level of high frequency chrominance activity to the level of high frequency luminance activity. In this embodiment, high pass filters 11 and 16, the rectification and low pass filtering circuitry 17, delay 12, and the combiner 21 (generally summing circuit 22) are the same as they were in the embodiment of FIG. 2, except that the delay circuit 12 is now equivalent to the delay through the high pass filter 11 and bipolar clipping circuit 15 (instead of multiplier 14). In this embodiment, clipping circuit 19 has been replaced with min-max clipping circuit 20, and multiplier 14 has been replaced with bipolar clipping circuit 15. Accordingly, $|Y_{hp}'|_{clipped}$ is now constrained in both directions, i.e., not only does it have a maximum value, C3, but now it also has a minimum value, C2, as well. Furthermore, the bipolar clipping circuit 15 now constrains $C_{hpc}$ to be less than $|Y_{hp}'|_{clipped}$ when $C_{hp}$ is positive and greater than $-|Y_{hp}'|_{clipped}$ when $C_{hp}$ is negative.

Figure 5:
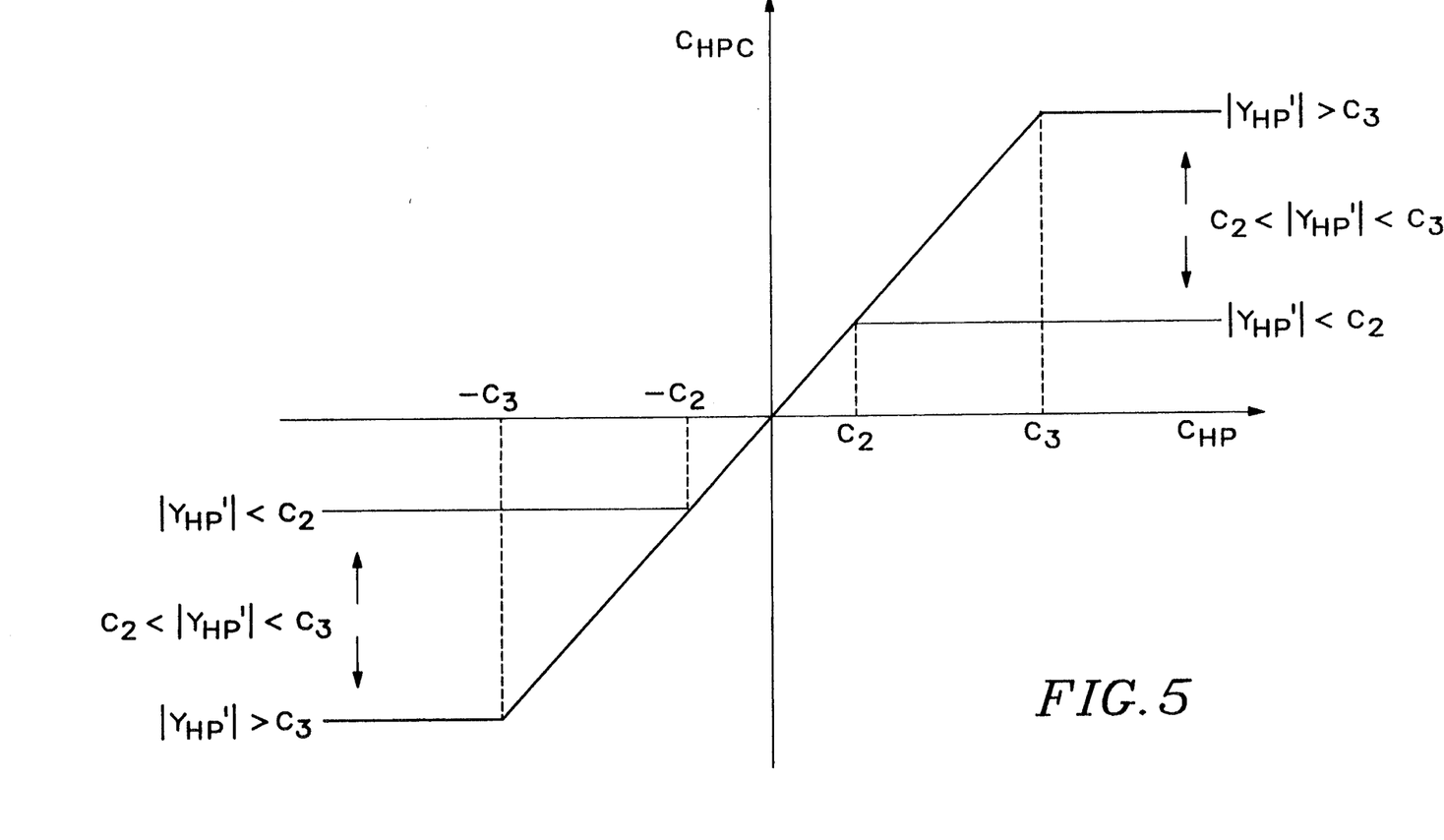
FIG. 5 is a graph of $C_{hpc}$ versus $C_{hp}$ according to the preferred embodiment of the present invention.

Referring now to FIG. 5, if $|Y_{hp}'|$ is greater than C3, indicating a high level of luminance detail, $C_{hp}$ is clipped to highest positive and lowest negative levels, and a high, but not unlimited, level of chrominance filtering occurs. If $|Y_{hp}'|$ is less than C2, indicating a low level of luminance detail, $C_{hp}$ is clipped to be less than C2 and greater than $-C2$ and a limited amount of chrominance filtering occurs. And, when $|Y_{hp}'|$ is between C2 and C3, indicating a level of luminance detail that is within a moderate range, $C_{hp}$ is clipped to a variable intermediate level that is proportional to the value of $|Y_{hp}'|$, and a proportional intermediate level of chrominance filtering occurs.

In the embodiment shown in FIG. 4, C2 determines the minimum amount of the high frequency content of chrominance which can be subtracted from the original chrominance signal without regard to the high frequency luminance content. Typically C2 will have a value between 0% and 25% of the maximum expected chrominance value.

In the preferred embodiment of the invention shown in FIG. 4, the role of C0 has been changed by the presence of C2. Rather than providing both an offset and a minimum, as it did in FIG. 2, C0 now only provides an offset to the level of apparent high frequency luminance present, with the minimum value of $|Y_{hp}'|$ clipped being determined by C2. The offset provided by C0 makes $|Y_{hp}'|$ larger and therefore C3 is encountered sooner.

The preferred embodiment of the variable chrominance filter of the present invention limits chrominance detail, i.e., high frequency components, based on the relative amounts of chrominance and luminance detail present, and can be implemented without the need for full multiplication. The relationship between chrominance and luminance detail can be adjusted with coefficients Cl, the scaling factor, and C0, the offset constant. A minimum amount of chrominance detail that will be removed without regard to the level of luminance detail present can be established by varying C2, the minimum limit for $|Y_{hp}'|$, while the absolute maximum level of chrominance detail that can be removed is controlled by C3, the maximum limit for $|Y_{hp}'|$.

Both embodiments of the variable chrominance filter described above can be used in the vertical dimension, the horizontal dimension, or both. In a preferred use of the filters, as shown in FIG. 1, one stage is used to provide horizontal filtering and another stage is used to provide vertical filtering.

Figure 6:
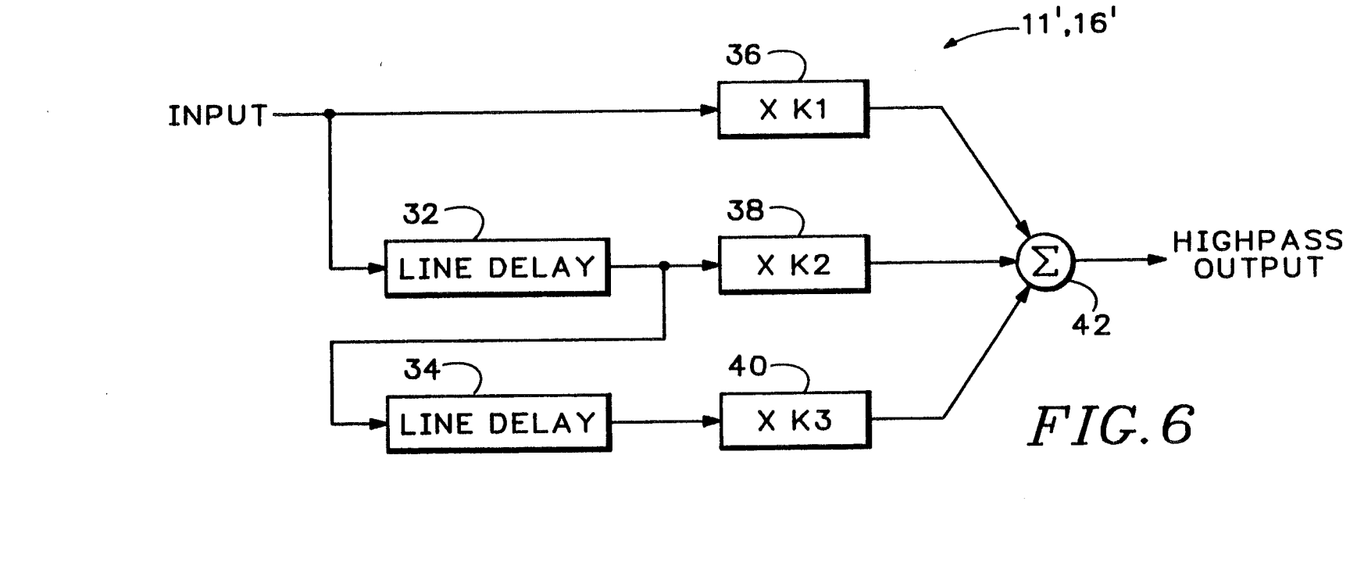
FIG. 6 is a block diagram of a vertical filter.

To use the variable chrominance filter in the vertical dimension, the high pass filters 11 and 16 in FIGS. 2 and 4 should be implemented as shown in FIG. 6. The input signal is applied to a line delay element 32 and multiplied by coefficient K1 in the top element 36 of a comb filter. The output of the line delay element 32 is applied to another line delay element 34 and multiplied by coefficient K2 in the middle element 38 of the comb filter. The output of line delay element 34 is multiplied by coefficient K3 in the bottom element 40 of the comb filter. The K1 and K3 coefficients are normally $-\frac{1}{4}$, and the coefficient K3 is then $+\frac{1}{2}$. The results of the multiplication by all three coefficients are summed by summing circuit 42 to produce the vertically high pass filtered output.

When a vertical variable chrominance filter, as described above, is used, the delay element 12 in FIGS. 2 and 4 should be lengthened by one line delay. More complex vertical filters can also be realized by increasing the number of line delay elements and coefficients, and by varying the coefficient values, as is well known in the art. And, while the delay through the luminance and chrominance high pass filters should match, the two filters do not need to have identical responses.

While the variable chrominance filters of the present invention are usually used in a multiplexed fashion from pixel to pixel to filter both U and V or I and Q components, in some circumstances, i.e., when filtering horizontally for NTSC without other filtering to provide bandpass limiting, it would be desirable to have two separate filters for the different I and Q component bandwidths as shown in FIG. 1.

The variable chrominance filter of the present invention, is suitable for use in encoders, where it is desirable to reduce chrominance detail to some extent in order to limit dot-crawl artifacts. However, the problem to be solved at the decoding end is different. In the course of encoding a chrominance signal into a composite signal and then separating the chrominance signal from the luminance signal, further chrominance detail is lost, with the energy going to dot-crawl artifacts instead. Use of the variable chrominance filter shown in FIG. 4 would further reduce the chrominance, which is undesirable.

However, if the minus sign on the input of the $C_{hpc}$ input to summing circuit 22 is changed to a plus sign, the result is an additive variable chrominance filter that is suitable for restoring chrominance in a decoder. Again, the FIG. 4 embodiment is preferable to the FIG. 2 embodiment cin not requiring a multiplier and in providing a more desirable relationship between high frequency luminance levels and high frequency chrominance removal.

While a preferred embodiment of the present invention has been shown and described, it will be apparent to those skilled in the art that many changes and modifications may be made without departing from the invention in its broader aspects. The claims that follow are therefore intended to cover all such changes and modifications as fall within the true spirit and scope of the invention.

I claim:

1. A method for filtering a chrominance signal comprising the steps of:
   generating a chrominance detail signal from the chrominance signal;
   delaying a chrominance signal to produce a delayed chrominance signal;
   limiting the chrominance detail signal according to a luminance detail signal to produce a limited chrominance detail signal; and
   combining the limited chrominance detail signal with the delayed chrominance signal to produce a variably filtered chrominance signal.

2. A method according to claim 1 wherein the limited combining step comprises subtracting the limited chrominance detail signal from the delayed chrominance signal.

3. A method according to claim 1 wherein the combining step comprises adding the chrominance detail signal to the chrominance signal.

4. An apparatus for filtering a chrominance signal comprising:
   means for generating a chrominance detail signal from the chrominance signal;
   means for delaying the chrominance signal to produce a delayed chrominance signal;
   means for limiting the chrominance detail signal according to a luminance detail signal to produce a limited chrominance detail signal; and
   means for combining the limited chrominance detail signal with the delayed chrominance signal to produce a variably filtered chrominance signal.

5. An apparatus according to claim 4 wherein the means for combining comprises means for subtracting the limited chrominance detail signal from the delayed chrominance signal.

6. An apparatus according to claim 4 wherein the means for combining comprises means for adding the limited chrominance detail signal to the delayed chrominance signal.

7. A method for filtering a chrominance signal comprising the steps of:
   generating a chrominance detail signal from the chrominance signal;
   delaying the chrominance signal to produce a delayed chrominance signal;
   clipping the chrominance detail signal to a bipolar fashion according to a luminance detail signal to produce a clipped chrominance detail signal; and
   combining the clipped chrominance detail signal with the delayed chrominance signal to produce a variably filtered chrominance signal.

8. A method according to claim 7 wherein the clipping step comprises the steps of:
   high pass filtering a luminance signal to produce a high pass filtered luminance signal;
   rectifying and low pass filtering the high pass filtered luminance signal to produce an absolute value signal;
   multiplying the absolute value signal by a first constant to produce a scaled absolute value signal; and
   adding a second constant to the scaled absolute value signal to produce the luminance detail signal.

9. A method according to claim 8 wherein the clipping step further comprises the step of:
   clipping the luminance detail signal to be greater than a minimum value determined by a third constant and to be less than a maximum value determined by a fourth constant.

10. A method according to claim 9 wherein the fourth constant is unity.

11. A method according to claim 7 wherein the combining step comprises additively combining the clipped chrominance detail signal and the delayed chrominance signal.

12. A method for filtering a chrominance signal comprising the steps of:
    generating a chrominance detail signal from the chrominance signal;
    delaying the chrominance signal to produce a delayed chrominance signal;
    scaling the chrominance detail signal to produce a delayed chrominance signal;
    scaling the chrominance detail signal according to a luminance detail signal to product a scaled chrominance detail signal; and
    combining the scaled chrominance detail signal with the delayed chrominance signal to produce a variably filtered chrominance signal.

13. A method according to claim 12 wherein the scaling step comprises the step of:
    high pass filtering a luminance signal to produce a high pass filtered luminance signal;

rectifying and low pass filtering the high pass filtered luminance signal to produce an absolute value signal;

multiplying the absolute value signal by a first constant to produce a scaled absolute value signal; and adding a second constant to the scaled absolute value signal to produce the luminance detail signal.

14. A method according to claim 13 wherein the step of adding the second constant to the scaled absolute value signal produces an offset signal and the scaling step further comprises the step of:

clipping the offset signal to be less than a maximum value determined by a third constant.

15. A method according to claim 14 wherein the third constant is unity.

16. A method according to claim 12 wherein the combining step comprises additively combining the scaled chrominance detail signal and the delayed chrominance signal.

17. An apparatus for filtering a chrominance signal comprising:

means for generating a chrominance detail signal from the chrominance signal;

means for delaying the chrominance signal to produce a delayed chrominance signal;

means for clipping the chrominance signal in a bipolar fashion according to a luminance detail signal to produce a clipped chrominance detail signal; and means for combining the clipped chrominance detail signal with the delayed chrominance signal to produce a variably filtered chrominance signal.

18. An apparatus according to claim 17 wherein the clipping means comprises:

means for high pass filtering a luminance signal to produce a high pass filtered luminance signal;

means for rectifying and low pass filtering the high pass filtered luminance signal to produce an absolute value signal;

means for multiplying the absolute value signal by a first constant to produce a scaled absolute value signal; and means for adding a second constant to the scaled absolute value signal to produce the luminance detail signal.

19. An apparatus according to claim 18 wherein the clipping means further comprises:

means for clipping the luminance detail signal to be greater than a minimum value determined by a third constant and to be less than a maximum value determined by a fourth constant.

20. An apparatus according to claim 19 wherein the fourth constant is unity.

21. An apparatus according to claim 17 wherein the means for combining comprises means for additively combining the clipped chrominance detail signal and the delayed chrominance signal.

22. An apparatus for filtering a chrominance signal comprising:

means for generating a chrominance detail signal from the chrominance signal;

means for delaying the chrominance signal to produce a delayed chrominance signal;

means for scaling the chrominance detail signal according to a luminance detail signal to produce a scaled chrominance detail signal; and means for combining the scaled chrominance detail signal with the delayed chrominance signal to produce a variably filtered chrominance signal.

23. An apparatus according to claim 22 wherein the scaling means comprises:

means for high pass filtering a luminance signal to produce a high pass filtered luminance signal;

means for rectifying and low pass filtering the high pass filtered luminance signal to produce an absolute value signal;

means for multiplying the absolute value signal by a first constant to produce a scaled absolute value signal; and means for adding a second constant to the scaled absolute value signal to produce the luminance detail signal.

24. An apparatus according to claim 23 wherein the means for adding the second constant to the scale absolute value signal produces an offset signal and the scaling means further comprises:

means for clipping the offset signal to be less than a maximum value determined by a third constant.

25. An apparatus according to claim 24 wherein the third constant is unity.

26. An apparatus according to claim 22 wherein the means for combining comprises means for additively combining the scaled chrominance detail signal and the delayed chrominance signal.

* * * * *

UNITED STATES PATENT AND TRADEMARK OFFICE
CERTIFICATE OF CORRECTION

PATENT NO. : 5,150,203

DATED : September 22, 1992

INVENTOR(S) : Jon A. Fairhurst

It is certified that error appears in the above-identified patent and that said Letters Patent is hereby corrected as shown below:

Col. 7,

Claim 2, line 56 - delete "limited"

Col. 8,
Claim 7, line 21 - Change "to" to "in"

Col. 8,
Claim 12, line 57 & 58 - delete "scaling the chrominance detail signal to produce a delayed chrominance signal;"

Signed and Sealed this

Eighteenth Day of January, 1994

Attest:

BRUCE LEHMAN

Attesting Officer

Commissioner of Patents and Trademarks